(12) United States Patent
Stass et al.

(10) Patent No.: US 6,513,481 B2
(45) Date of Patent: Feb. 4, 2003

(54) NON RECTANGULAR SHAPED FLEXIBLE PANEL AIR FILTER CARTRIDGE

(75) Inventors: Arden Stass, Chatham (CA); Kent Kallsen, Oregon, WI (US)

(73) Assignee: Siemens VDO Automotive Inc., Tilbury (CA)

( * ) Notice: Subject to any disclaimer, the term of this patent is extended or adjusted under 35 U.S.C. 154(b) by 0 days.

(21) Appl. No.: 09/989,879

(22) Filed: Nov. 21, 2001

(65) Prior Publication Data

US 2002/0069849 A1 Jun. 13, 2002

Related U.S. Application Data

(60) Provisional application No. 60/254,246, filed on Dec. 8, 2000.

(51) Int. Cl.[7] .......................... B01D 39/10; B01D 46/42
(52) U.S. Cl. .................................... 123/198 E
(58) Field of Search ...................... 123/198 E

(56) References Cited

U.S. PATENT DOCUMENTS 5,059,221 A * 10/1991 McWilliam .................. 55/276
5,622,583 A    4/1997 Ernst et al.
6,231,630 B1 * 5/2001 Ernst et al. ................. 55/385.3

OTHER PUBLICATIONS

Photographs of Prior Art Air Filters, Exhibits A–D.

* cited by examiner

*Primary Examiner*—Paul J. Hirsch

(57) ABSTRACT

An air induction system (10) comprises a flow body (14) and a filter housing (16). (FIG. 1). The filter housing (16) has an opening (26) of a first shape. (FIG. 1). A filter support (34) has an outer periphery (38) of about the first shape and an inner periphery (42) of a second different shape. The support is operatively connected to the housing (16). (FIG. 1). A symmetric filter (46) is also connected to the support (34). (FIG. 1). The air induction system attenuates engine noise for a motor vehicle.

12 Claims, 6 Drawing Sheets

NON RECTANGULAR SHAPED FLEXIBLE PANEL AIR FILTER CARTRIDGE

This application claims priority to Provisional Patent Application Serial No. 60/254,246 filed on Dec. 8, 2000.

BACKGROUND OF THE INVENTION

This invention relates to an air induction system that may accommodate a standard flexible panel filter with a rectangular pleat block in a non-rectangular housing for a motor vehicle such as an automobile that may employ a passive noise attenuation system.

Air induction systems are used to provide clean air to a vehicle's engine. Such systems generally comprise a flow body, a filter housing and an air filter. Air is received into the flow body through an air intake and passes into the filter housing through a filter. The filter removes contaminants and particles that may otherwise interfere with the operation of the vehicle engine. Clean air then passes to the engine to combine with fuel in the combustion chamber.

Just as air flows into the engine, noise from the engine may propagate out of the air induction system and eventually find its way into the vehicle's passenger cabin. Such noise is generally undesirable. Manufacturers have accordingly developed both passive and active noise attenuation systems to reduce or eliminate such engine noise. One such passive system involves using the filter housing as an expansion chamber to deaden sound. As known, a particular frequency of a frequency range may be selected for enhanced noise attenuation. By tuning the filter housing to this frequency, sound traveling through the filter housing may cancel itself through destructive interference and result in noise attenuation. That is, the filter housing is sometimes designed to attenuate a particular frequency range.

Due to limited space within a motor vehicle, an air induction system using its filter housing as part of a passive noise attenuation system may result in the design of an asymmetrically shaped filter housing. To accommodate this shaped housing, manufacturers have designed air filters in asymmetric shape to fit within these housings.

Panel air filters for motor vehicle applications typically consist of a filtration medium, a support structure, and a seal. The filtration media can be cellulose based, synthetic based, or a combination thereofto achieve the desired filtration performance with respect to contaminant removal efficiency, service life, and flow restriction. Typically, cellulose media is the most cost effective.

A well known panel air filter design and manufacture method is a rectangular filter consisting of a rectangular pleat block of cellulose media, a support structure of expanded metal, and a flexible urethane foam material which joins and seals the support and pleat block and also forms the seal for interaction with air cleaner housing. This filter manufacture method has relatively low tooling investment costs and fast production rates. Currently in order to have an asymmetric filter with a non rectangular pleat block, non standard media processing techniques must be used, (Ref. U.S. Pat. No. 5,622,583) thus increasing the investment for manufacturing.

Another well known panel air filter design and manufacture method consists of injection molding plastic around a synthetic media where the polymeric properties of the frame and media create bond in the injection process. Typically, a rubber gasket is then fitted to the plastic frame to crease the seal for interaction with air cleaner housing. This filter manufacture method has relatively high tooling investment costs and slower production rates.

SUMMARY OF THE INVENTION

The present invention comprises a flow body and filter housing. As known, air passes through an air intake to the filter housing through a flow body and to an engine of a motor vehicle, such as an automobile. The filter housing has an opening of a particular shape to permit the passage of air. Unlike existing filter housings for motor vehicles, the invention has a filter support that has an outer perimeter suited to the shape of the filter housing opening and an inner perimeter suited to mount a standard filter. In this way, a standard filter may be adapted for use with filter housings having non-standard openings.

Moreover, the filter may utilize a rectangular in shape pleat block and be composed of cellulose, thereby lowering manufacturing cost of the air induction system. In addition, seals may be employed between the support and filter media as well as the housing and support so as to ensure the flow of air through the filter.

Another feature of the invention comprises a flow body, a filter housing, and a uniquely designed filter support. The support allows for the use of a standard rectangular pleat block air filter and also has an outer perimeter with at least two flanges extending from the inner perimeter of the support that mounts the standard filter. The filter may be rectangular, composed of cellulose, and have pleats. Seals may also be employed.

The invention permits the use of a standard rectangular pleat block filter with a passive noise attenuation system. The filter housing may attenuate engine noise by having a particular dimension tuned to a range of frequencies as known. However, rather than use a specially designed filter to fit within the unique shape of the housing, the invention employs a standard filter with a support having an outer perimeter of the shape of the housing to fit the housing and an inner perimeter of the shape of the filter to fit the filter. The filter housing may have a predetermined dimension of a quarter or a half wavelength of a frequency selected from the range of frequencies. Such a design results in the destructive interference of sound within the housing, thereby attenuating engine noise, which may be in the range of 60 hertz to 600 hertz.

The invention thus permits the use of a standard filter with a non-standard shaped filter housing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1A shows one aspect of the invention.

DETAILED DESCRIPTION OF THE PREFERRED EMBODIMENTS

Figure 1:
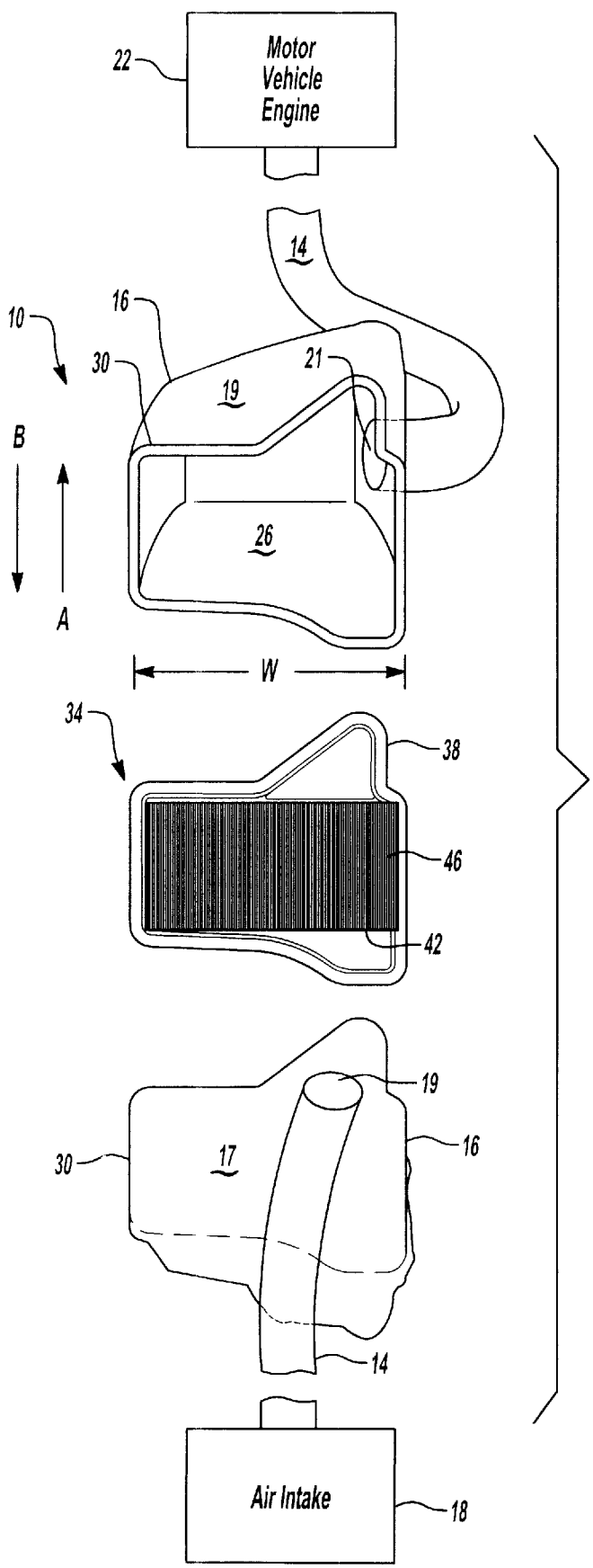
FIG. 1 shows an embodiment of the invention including flow body, filter housing, filter support and symmetric filter.

FIG. 1 illustrates the inventive air induction system 10. Air induction system comprises a flow body 14, filter housing 16, filter support 34, and symmetric filter pleat block 46. Air intake 18 and engine 22, such as for a motor vehicle, are shown schematically to illustrate the environment of air induction system 10. Air is received into air intake 18, passes flow body 14 through hole 19, and generally travels along the direction of arrow A through filter housing 16, symmetric filter pleat block 46, through hole 21, flow body 14 and to engine 22. Engine noise may emanate from engine 22 along the path of arrow B and propagate through air induction system 10 to a passenger compartment (not shown).

As known, manufacturers may employ the filter housing 16 as an expansion chamber to attenuate such engine noise. In such an instance, as one of ordinary skill in the art would recognize, filter housing 16 is tuned to a particular range of acoustic frequencies so that engine noise propagating through filter housing 16 is self-canceling. Typically, a frequency in the middle of the range of interest is selected as a target for noise cancellation, with frequencies around the range also attenuated to a lesser degree. For a filter housing, the range of frequencies of interest is generally a subset of the broader range of 60 hz to 600 hz. Such design techniques are as known, and themselves form no part of this invention.

To attenuate engine noise in this range, manufacturers generally make a dimension of the filter housing, whether the length, width, or height of the housing, a quarter or, alternatively, a half of the wavelength of the target frequency. The filter and filter support are treated as acoustically transparent or invisible for this purpose as is known. Such a design construction causes destructive interference of the engine noise within the particular range of interest. Thus, in filter housing 16, say width W of filter housing 16, is either a quarter or half wavelength of the target frequency, the housing will attenuate the frequency. Length and height of filter housing 16 may also be so constructed to attenuate engine noise as known. Generally, such a design must be accomplished in limited available space within the engine compartment.

As a consequence of the desire to attenuate engine noise and the constraint of available space, filter housing 16 may have opening 26 with a shape, such as an asymmetric shape, that may not conform to a standard available air filter, such as a rectangular filter. As shown in FIG. 1A, the shape could have ear-like extensions 36 and 37 to achieve the desired dimension. That is, the shape of the opening is irregular thus resulting in an irregularly shaped filter. As also shown, the ears are unequal in size, thus results in a non-symmetric shape. As explained above, this shape (irregular and perhaps asymmetric) generally requires the construction of a non-standard and non-rectangular air filter. Accordingly, tooling must be designed and constructed to mold the filter support to filter and filter support to fit such a filter housing 16, resulting in great expense. Moreover, cellulose fiber is difficult to use because of its tendency to burn during the molding process. Also, synthetic or polymeric paper molds more easily to the plastic of the filter support. Hence, a manufacturer may employ synthetic filter paper, which is more expensive than cellulose paper, as the asymmetric filter.

This invention offers an inexpensive alternative. As seen in FIG. 1, filter housing 16 has opening 26 of a first shape 30 that may not be suitable for a standard rectangular filter and filter support. However, unlike existing air induction systems, filter housing 16 operatively connects to filter support 34 that comprises outer periphery 38 of about the shape of opening 26 and inner periphery 42 to accommodate symmetric filter 46, typically a rectangular pleated filter. Thus, the invention adapts a standard filter to a non-standard filter housing 16. Symmetric filter pleat block 46 and inner periphery 42 may have a different shape than the shape of opening 26.

Figure 7:
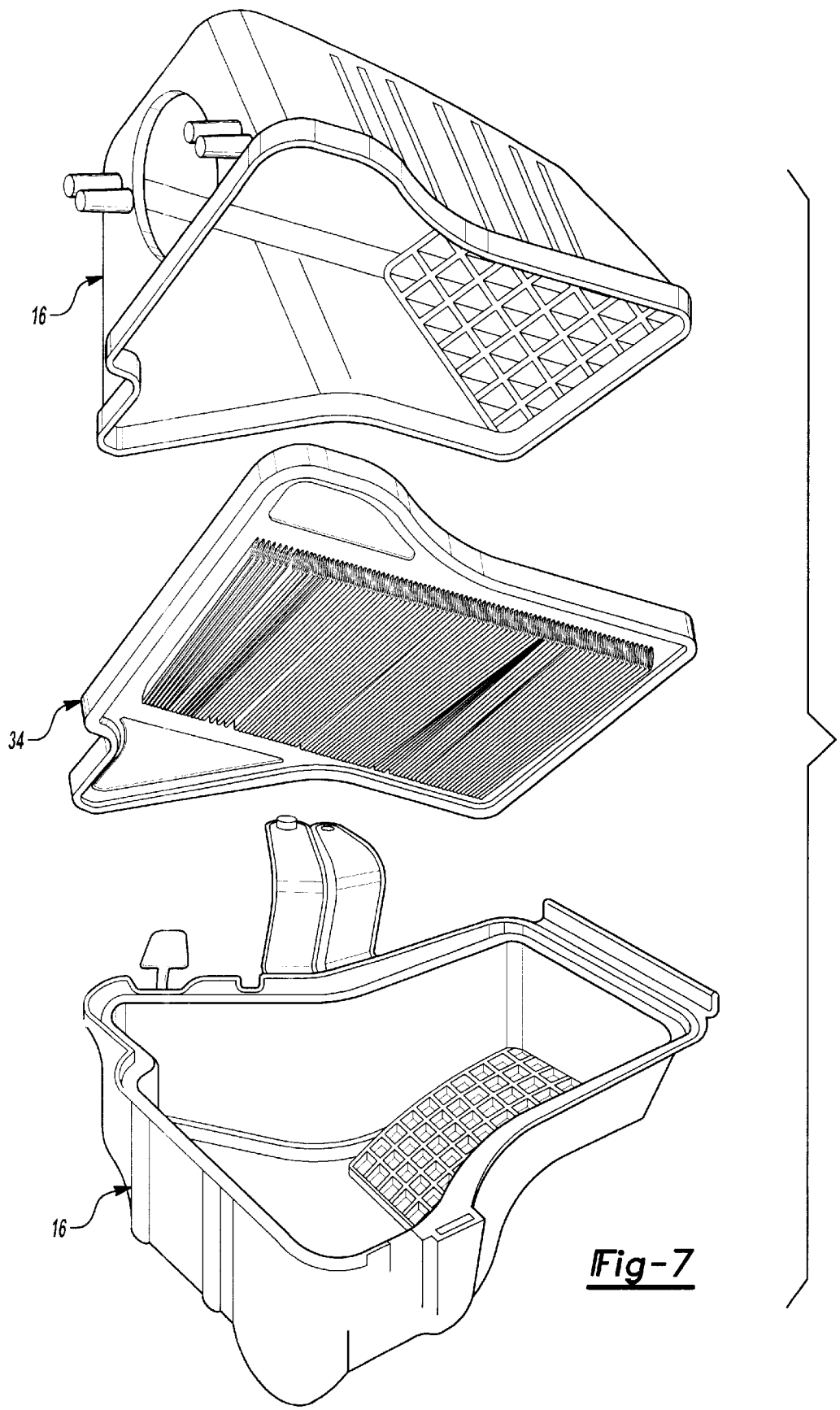
FIG. 7 shows another view of filter housing, filter, and filter support of FIG. 1.
Figure 8:
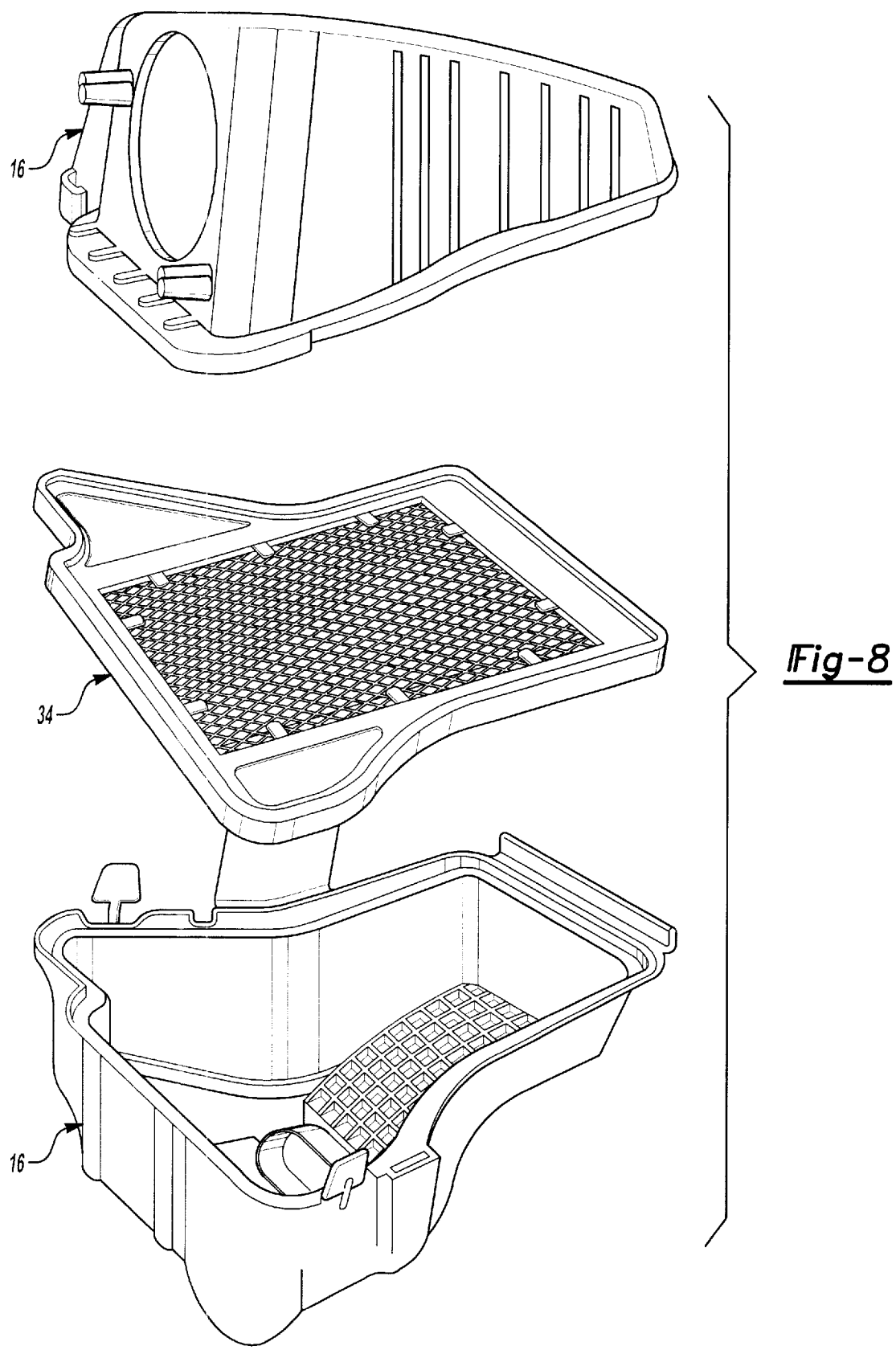
FIG. 8 shows another view of the embodiment of FIGS. 1 and 7.

Filter support 34 may connect to filter housing 16 by being sandwiched between first housing portion 17 and second housing portion 19 as known. FIGS. 7 and 8 show how filter support 34 is sandwiched in filter housing 16. Alternatively, filter housing 16 may comprise a single housing with a filter cartridge design that is commonly available. So, filter housing 16 may be combined with filter support 34 by standard available connection means.

Figure 2:
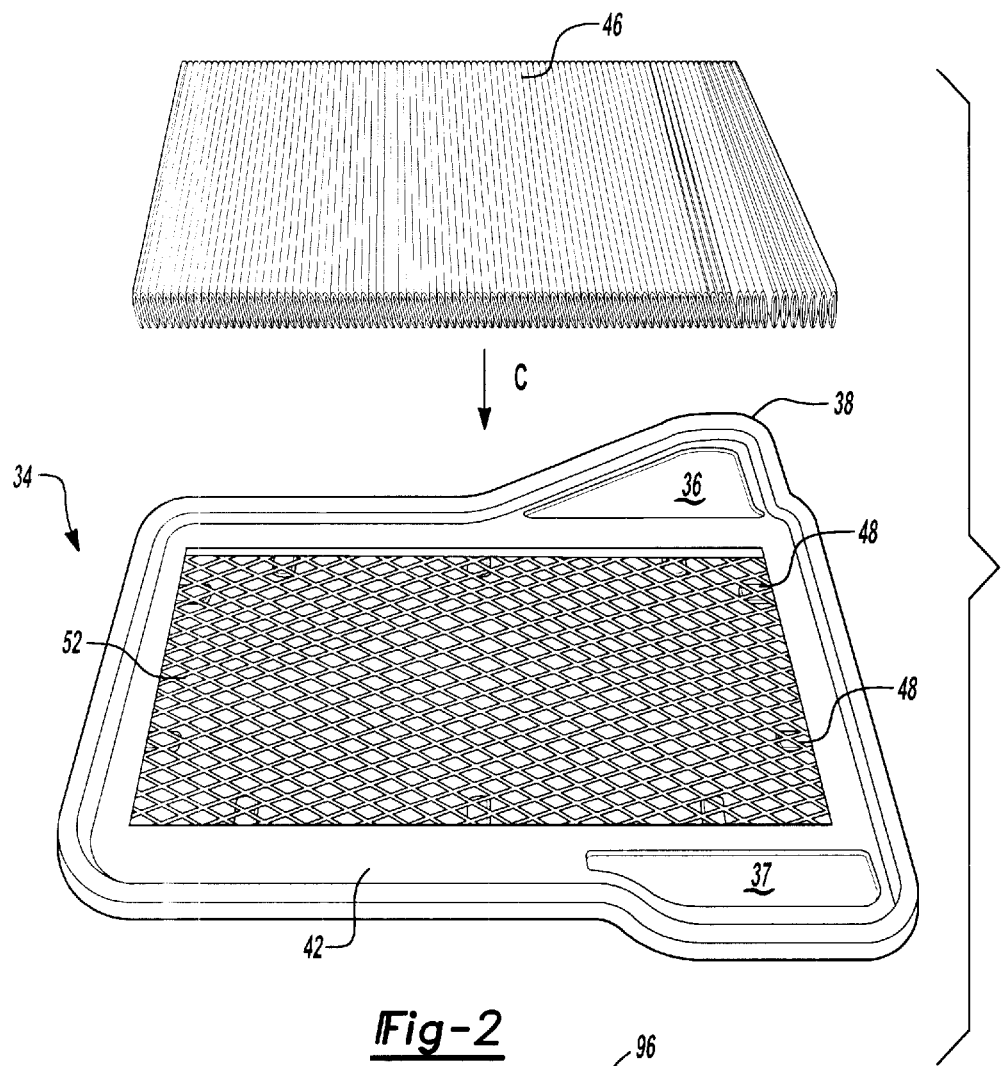
FIG. 2 illustrates the filter and filter support of the embodiment of FIG. 1.

FIG. 2 illustrates filter support 34 and filter 46 in an uncombined state. As seen, filter support 34 comprises both outer periphery 38 and inner periphery 42. Outer periphery 38 is designed to accommodate the shape of filter housing 16 while inner periphery 42 may have a rectangular shape to accommodate the rectangular shape of air filter pleat block 46. As shown, outer periphery 38 comprises at least two flanges 36 and 37, each of which may extend from inner periphery 42 to filter housing 16 to correspond to ears 100. Supporting symmetric filter pleat block 46 within filter support 34 is wire mesh backing 52, which itself is supported by tabs 48. Filter support 34 may be made of metal or other suitable material. Symmetric filter 46 may be made of cellulose, which is cheaper than synthetic paper. Filter 46 may also be a pleated filter, such as a standard flexible panel filter media.

Figure 3:
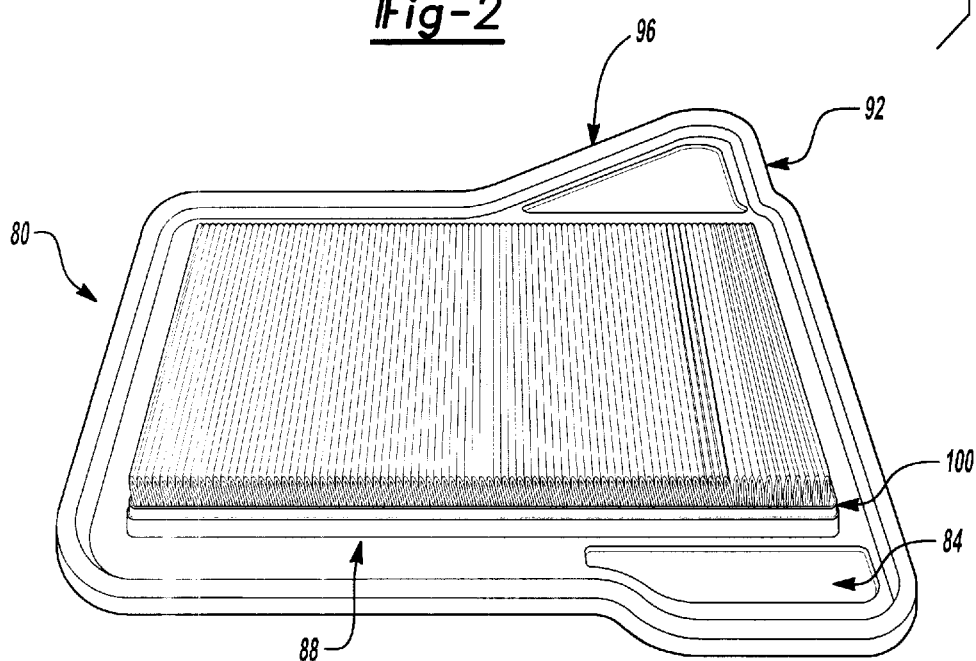
FIG. 3 illustrates another embodiment, employing less sealing than the embodiment of FIG. 1.

Filter pleat block 46 may be bonded with filter support 34 rather than molded together as in the prior art. Filter 46 is placed on top of filter support 34 on wire mesh backing 52 within inner periphery 52 along the direction of arrow C. Then, as can be seen in FIG. 3, by known process, a molded or poured urethane seal may be placed along inner periphery 42 and outer periphery 38. Thus, filter seal 60 maybe formed and housing seal 64 may be formed to ensure proper air flow through filter 46.

FIG. 3 illustrates filter support 80 in which metal 84, such as steel, is exposed and not sealed. Inner periphery 88 and outer periphery 92 are shown each with seals, housing seal 96 and filter seal 100.

Figure 4:
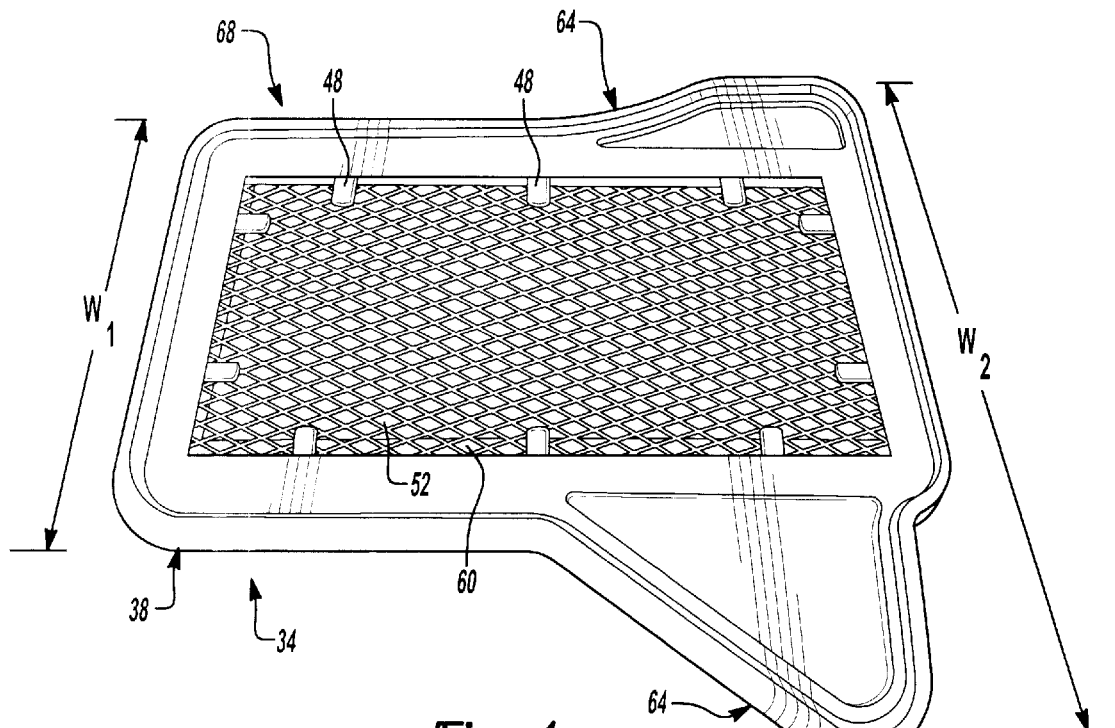
FIG. 4 illustrates another view of the filter and filter support of FIG. 1, illustrating a wire mesh backing.

FIG. 4 illustrates a reverse view of the embodiment of FIG. 3. Shown are tabs 48 interconnecting wire mesh backing 52 to filter support 34. Filter support 34 may have a first portion 68 with first width W1 and a second portion 72 having a second width W2. As seen, first width W1 is less than second width W2. One can envision the use of many other shapes for filter housing 16 and thus opening 26. The invention affords designers the freedom to design filter housing 16 in any shape to maximize acoustic volume while still using a standard filter. FIG. 4 also illustrates filter seal 60 forming a bond with filter paper 52 and filter support 34 and its tabs 48. Filter paper 52 may be secured to filter support 34 by widely available connection means.

Figure 5:
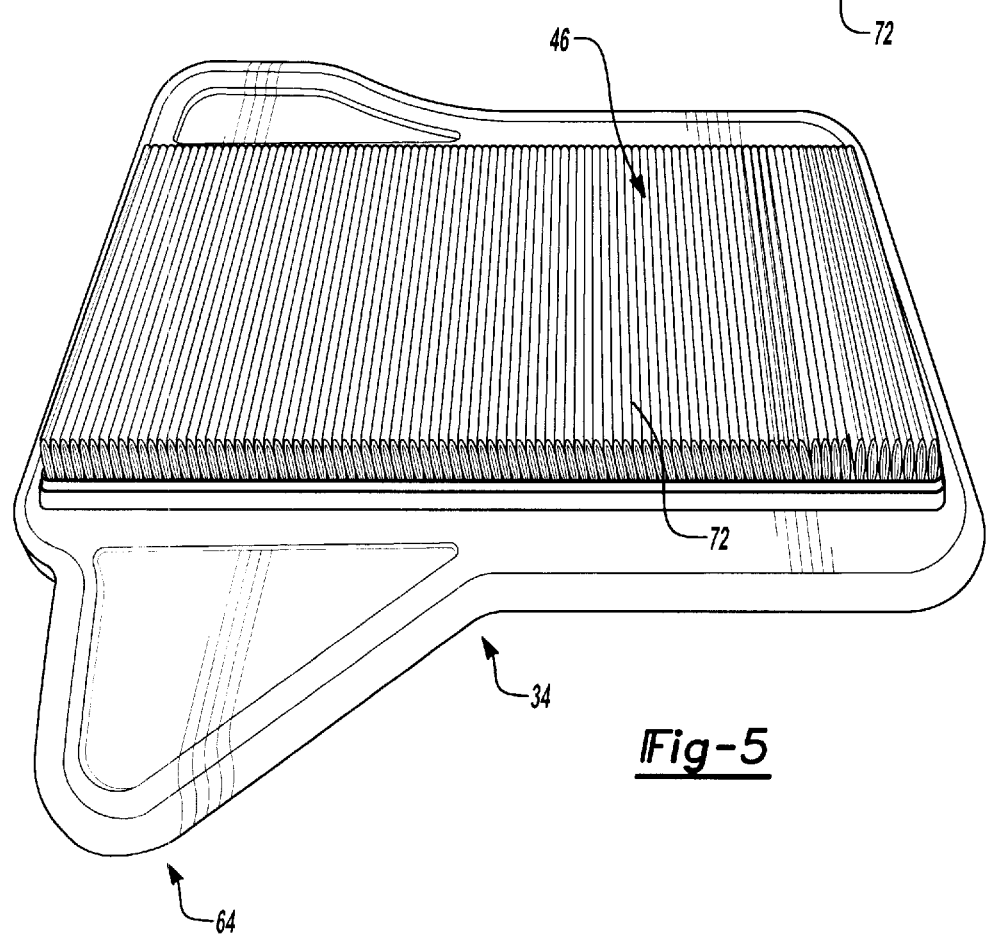
FIG. 5 illustrates another embodiment of the filter and filter support of FIG. 1, highlighting the pleated filter paper used as the filter.
Figure 6:
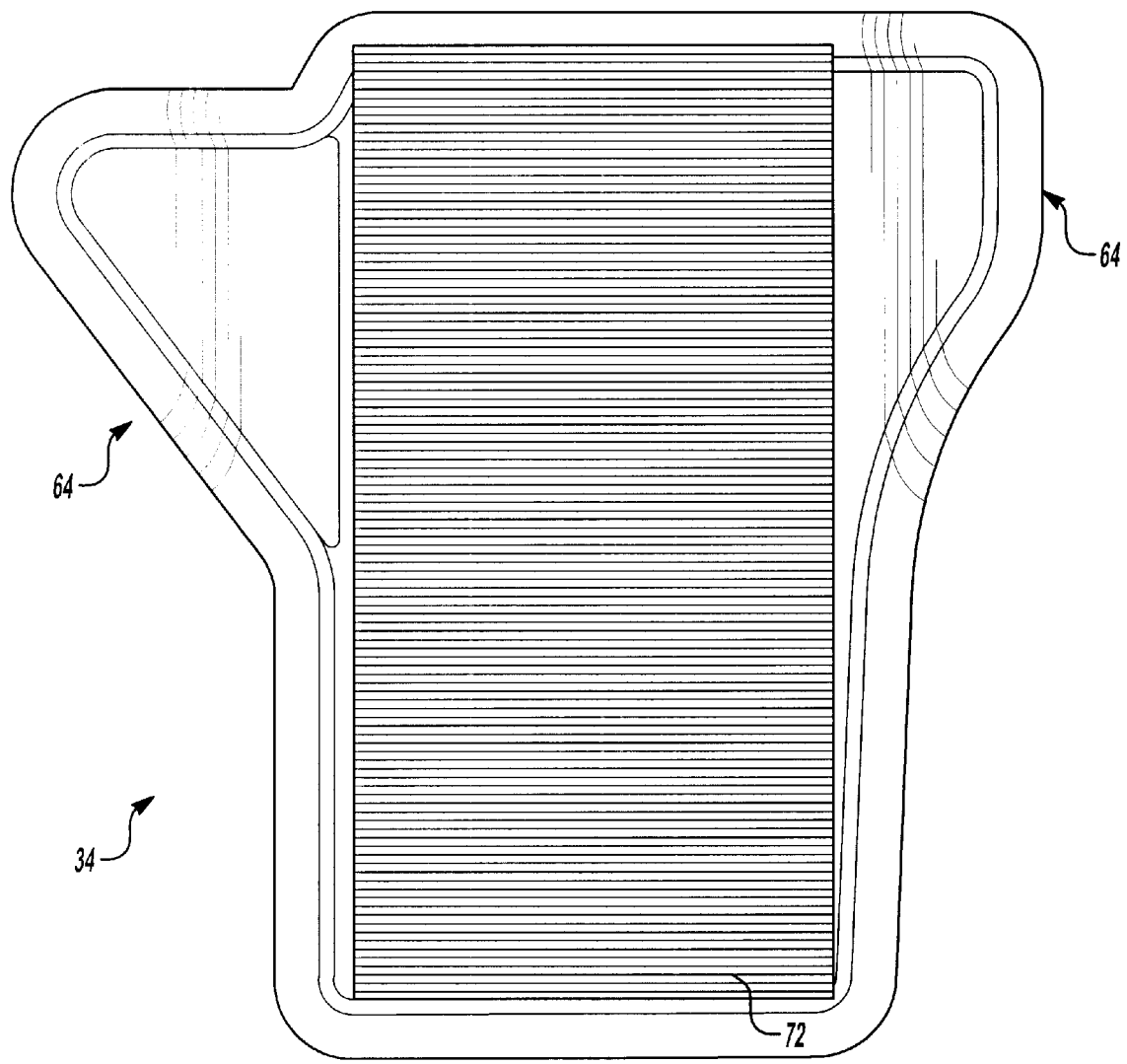
FIG. 6 illustrates another view of the filter support and filter of FIG. 1.

FIG. 5 illustrates filter support 34 and symmetric filter 46. This particular view highlights the use of pleated filter paper 72. FIG. 6 shows the same paper and also highlights housing seal 64 of filter support 34. Thus, filter housing 16 has opening 26 of a first shape. Filter support 34 has outer periphery 38 of about the same shape as opening 26. Filter support 34, however, also has inner periphery 42 of a second shape different from the first shape. This second shape may be designed to accommodate the symmetric shape of filter housing 16 and the symmetric standard shape of symmetric filter 46. Also, a standard filter may be employed and consequently eliminate additional service and inventory costs incurred by stocking non-standard filters.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air induction system comprising:
    an engine for a motor vehicle;
    a flow body communicating air to said engine;
    a filter housing having an opening of a first shape, communicating with said flow body;
    a filter support having an outer periphery of about said first shape and an inner periphery of a second shape different from said first shape, operatively connected to said filter housing; and
    a symmetric filter pleat block of about said second shape, operatively connected to said filter support within said inner periphery wherein said first shape is the result of a design of said filter housing to result in noise attenuation of a particular range of frequencies of noise from said engine.

2. The air induction system of claim 1 wherein said symmetric filter pleat block has a rectangular shape.

3. The air induction system of claim 1 wherein said first shape includes at least two flanges extending outwardly to result in said outer periphery being non-rectangular.

4. The air induction system of claim 1 wherein said symmetric filter pleat block comprises cellulose.

5. An air induction system comprising:
    a flow body;
    a filter housing having an opening of a first shape, communicating with said flow body;
    a filter support having an outer periphery of about said first shape and an inner periphery of a second shape different from said first shape, operatively connected to said filter housing; and
    a rectangular symmetric filter pleat block of about said second shape, operatively connected to said filter support within said inner periphery wherein said first shape comprises at least two flanges extending outwardly to result in said outer periphery being non-rectangular wherein said first shape is the result of a design of said filter housing to result in noise attenuation of a particular range of frequencies of noise from said engine.

6. The air induction system of claim 5 wherein said flow body communicates air to a motor vehicle engine.

7. The air induction system of claim 5 wherein said symmetric filter pleat block comprises cellulose.

8. An air induction system comprising;
    an engine for a motor vehicle;
    a flow body communicating air to said engine;
    a filter housing having an opening of a first shape, communicating with said flow body;
    a filter support having an outer periphery of about said first shape and an inner periphery of a second shape different from said first shape, operatively connected to said filter housing; and
    a symmetric filter pleat block of about said second shape, operatively connected to said filter support within said inner periphery wherein said filter housing has a predetermined dimension tuned to a range of frequencies related to noise from said engine.

9. The air induction system of claim 8 wherein said predetermined dimension results in at least partial destructive interference of noise from said engine within said filter housing.

10. The air induction system of claim 9 wherein said predetermined dimension approximates a quarter wavelength of a frequency selected from said range of frequencies.

11. The air induction system of claim 9 wherein said predetermined dimension approximates a half wavelength of a frequency selected from said range of frequencies.

12. The air induction system of claim 8 wherein said range of frequencies comprises 60 hertz to 600 hertz.

* * * * *